E. A. HANFF.
ELECTRICAL SYSTEM.
APPLICATION FILED OCT. 14, 1916.
1,396,835.
Patented Nov. 15, 1921.
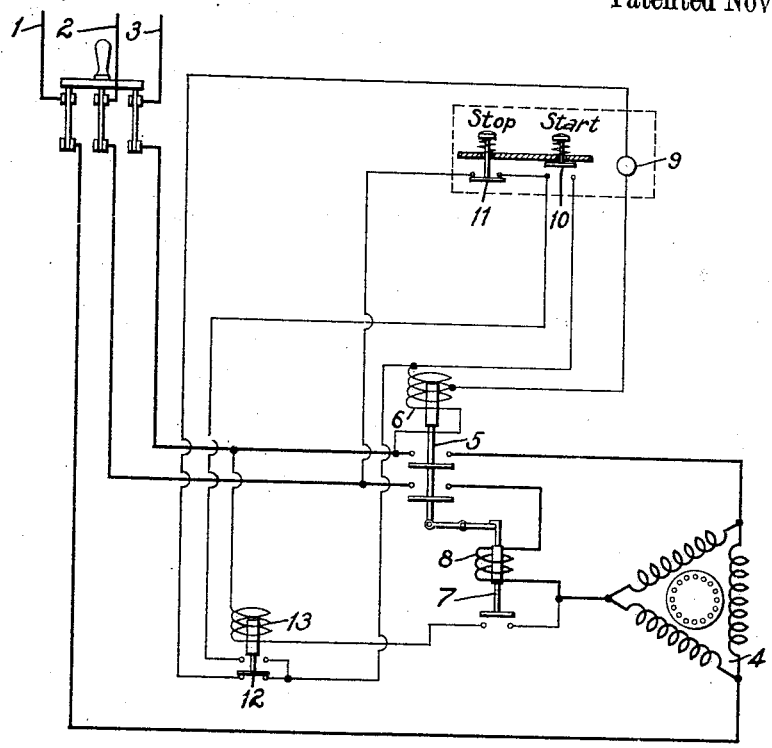
WITNESSES:
R. J. Fitzgerald.
R. J. Ridge.
INVENTOR
Edward A. Hanff.
BY
Wesley G. Carr
ATTORNEY

UNITED STATES PATENT OFFICE.

EDWARD A. HANFF, OF IRWIN, PENNSYLVANIA, ASSIGNOR TO WESTINGHOUSE ELECTRIC AND MANUFACTURING COMPANY, A CORPORATION OF PENNSYLVANIA.

ELECTRICAL SYSTEM.

1,396,835.  Specification of Letters Patent.  Patented Nov. 15, 1921.

Application filed October 14, 1916. Serial No. 125,607.

*To all whom it may concern:*

Be it known that I, EDWARD A. HANFF, a citizen of the United States, and a resident of Irwin, in the county of Westmoreland and State of Pennsylvania, have invented a new and useful Improvement in Electrical Systems, of which the following is a specification.

My invention relates to electrical systems and particularly to such systems as are employed in connection with the starting of electric motors.

My invention has for its object to provide a simple and efficient arrangement whereby the operator may be informed when the acceleration of the motor has reached a predetermined degree.

In the operation of electric motors that are controlled by push button switches or other controlling devices that automatically assume inoperative positions, it is essential that the operator be able to determine when the motor has accelerated to a predetermined degree. It is desirable, also, in certain cases, to provide means whereby the motor circuits will not remain closed if the controlling means is released before the motor has reached a predetermined speed or has been accelerated to a predetermined degree.

In the arrangement constructed in accordance with my invention, the main circuits of the motor are controlled by an electromagnetic switch having an actuating coil that is adapted to be connected to a source of alternating current. A signal lamp adapted for a voltage lower than that of the coil is connected across a portion of the turns of the coil. The coil operates in the manner of an auto transformer to apply a relatively small voltage to the lamp.

A relay switch, having an actuating coil in series with the motor, operates, when the current traversing the motor circuit falls to a predetermined value, to simultaneously effect the establishment of a holding circuit for the coil and to open the circuit of the lamp. The opening of the circuit of the lamp notifies the operator that the motor has accelerated to a predetermined degree and that the circuit of the motor will remain closed when a push button switch for controlling the circuit of the actuating coil is released.

In the accompanying drawing, the single figure is a diagrammatic view of circuits and apparatus embodying my invention.

Line conductors 1, 2 and 3, which may be connected to any suitable source of alternating current, supply energy to an alternating current motor 4. The primary circuits of the motor are controlled by a double-pole electromagnetic switch 5 having an actuating coil 6. A relay 7, which is mechanically connected to the switch 5, is provided with an actuating coil 8 that is in series with the motor. The relay 7 is adapted to open and close with the main switch 5 except when the current traversing the coil 8 exceeds a predetermined value, in which case, the relay 7 is maintained in its open position.

A signal lamp 9, which may be located adjacent to the controlling means, or at any other suitable or convenient place, is connected across a portion of the turns of the actuating coil 6. This arrangement is provided by reason of the fact that lamps are ordinarily adapted for much lower voltages than those applied to the circuits of electric motors. The circuit of the coil 6 is controlled by push button switches 10 and 11 which produce effects upon the operation of the motor corresponding to the legends placed adjacent to the respective switches.

A relay switch 12 having an actuating coil 13 operates to control the circuit of the lamp 9 and a holding circuit for the coil 6. The coil 13 is energized only upon the closing of the relay 7 when the current traversing the motor circuit falls to a predetermined value.

To start the motor, the push button switch 10 is actuated to complete a circuit for the actuating coil 6 which extends from line conductor 2, through push button switches 11 and 10, and coil 6, to line conductor 3. The energizing of coil 6 operates to close switch 5 and thus complete the circuits of the primary windings of the motor 4. At the same time, the coil 6 operates as an auto transformer to apply a voltage to the lamp 9 which bears the same relation to the line voltage as the number of turns of the coil 6 connected in circuit with the lamp bears to the total number of turns.

Since the motor 4 is connected directly to the line without interposing the usual starting transformers or resistors, the current traversing the motor circuit will be relatively heavy until the motor attains approximately its normal speed. The coil 8 is energized to maintain the relay 7 in its open position until the current traversing the coil and the motor windings falls to a predetermined value. The relay 7 then closes to complete a circuit for the actuating coil 13.

The relay 12 is then actuated to its upper position to open the circuit of the lamp 9 and to establish a holding circuit for the coil 6 through the push button switch 11. The push button switch 10 may be released by the operator at any time after the signal lamp 9 has been extinguished by the opening of its circuit. The push button switch 10 is ineffective to control the operation of the main switch 5 since the holding circuit mentioned above constitutes a shunt circuit for the switch 10.

To stop the motor, it is only necessary to actuate the push button switch 11 to open the circuit of the coil 6. The switch 5 then opens the circuits of the motor 4, and the relay 7, which is mechanically connected to the switch 5, opens the circuit of the coil 13. The switch 12 then occupies its illustrated position in readiness for the succeeding starting operation.

It will be noted that I have provided a simple arrangement whereby the operator is automatically notified that the acceleration of the motor has reached a predetermined degree at which the main switch will remain in its closed position regardless of the release of the manually operable controlling switch. I provide, also, an arrangement whereby a relatively low-voltage lamp may be employed in connection with circuits employing relatively high voltages without the use of additional apparatus for transforming the voltage of the line to that for which the lamp is adapted.

I claim as my invention:

1. In an electrical system, the combination with a switch having a reactive, actuating coil, of a signaling device permanently connected across a portion of the turns of said coil.

2. In an electrical system, the combination with a switch having a reactive, actuating coil and a lamp connected across a comparatively small portion of the turns of said coil, of means for connecting said coil to a source of current.

3. In an electrical system, the combination with a switch having an actuating coil and a signaling device connected across a portion of the turns of said coil, of means for connecting said coil to a source of alternating current, said coil serving as an autotransformer for applying a relatively small voltage to said signaling device.

4. In an electrical system, the combination with an electric motor, and a controlling switch therefor having an actuating coil, of a signaling device adapted for a lower voltage than the voltage of the circuit of said motor connected across a comparatively small portion of the turns of said coil and means for connecting said coil to a source of current.

5. In an electrical system, the combination with an electric motor, and a controlling switch therefor having a reactive, actuating coil, of a lamp connected across a comparatively small portion of the turns of said coil, and means for connecting said coil to a source of alternating current.

6. In an electrical system, the combination with an electric motor, and a controlling switch therefor having an actuating coil, of a signaling device connected across at least a portion of the turns of said coil, means for connecting said coil to a source of current, means for maintaining said coil connected to said source, and means for opening the circuit of said device under predetermined conditions to indicate that said maintaining means has become operative.

7. In an electrical system, the combination with an electric motor, and a controlling switch therefor having an actuating coil, of a lamp connected across at least a portion of the turns of said coil, means for connecting said coil to a source of alternating current, and means for opening the circuit of said lamp when the current traversing the motor circuit falls to a predetermined value.

8. In an electrical system, the combination with an electric motor, a controlling switch therefore having an actuating coil, and a switch for controlling the connection of said coil to a source of current, of a signaling device connected across a portion of the turns of said coil, and a switch for simultaneously completing a holding circuit for said coil and opening the circuit of said device.

9. In an electrical system, the combination with an electric motor, a controlling switch therefor having an actuating coil, and a switch for controlling the connection of said coil to a source of current, said second-named switch being adapted to normally assume an inoperative position, of a signaling device connected across a portion of the turns of said coil, and means for controlling a holding circuit for said coil and for controlling the circuit of said device to permit releasing said second-named switch under predetermined conditions without stopping the operation of said motor.

10. In an electrical system, the combination with an electric motor, a controlling switch therefor having an actuating coil, and a switch for controlling the connection of said coil to a source of current, of a signaling device connected across a portion of the turns of said coil, and for simultaneously completing a holding circuit for said coil and opening the circuit of said device when the current traversing the motor circuit falls to a predetermined value.

11. In an electrical system, the combination with an electric machine, and an impedance device in circuit therewith for controlling said machine, of a signaling device adapted for a lower voltage than the voltage of the circuit of said machine connected across a portion of said impedance device.

12. In an electrical system, the combination with an electric motor, and controlling means therefor, of a signaling device connected to said controlling means, means for controlling said controlling means and said device, and means for preventing the operation of said second-named means until the current traversing the motor circuit falls to a predetermined value.

13. In an electrical system, the combination with an electric motor, a controlling switch therefor having an actuating coil, and a switch for controlling the connection of said coil to a source of current, of a signaling device connected across a portion of the turns of said coil, a switch for simultaneously completing a holding circuit for said coil and opening the circuit of said device, said last-named switch having an actuating coil, a switch mechanically connected to said controlling switch for controlling the actuation of said second-named actuating coil, and means for preventing the actuation of said last-named switch until the current traversing the motor circuit falls to a predetermined value.

14. The combination with an electric machine, a controlling switch therefor having an actuating coil, and a signaling device, of means for simultaneously completing a holding circuit for said coil and opening the circuit of said device when the current traversing the circuit of said machine falls to a predetermined value.

In testimony whereof, I have hereunto subscribed my name this 3rd day of October, 1916.

EDWARD A. HANFF.